M. STEPHENS.
Cement-Pipes.

No. 158,539.

Patented Jan. 5, 1875.

Witnesses
Chas. H. Smith
Harold Serrell

Inventor
Melvin Stephens
per L. W. Serrell
atty

UNITED STATES PATENT OFFICE.

MELVIN STEPHENS, OF BROOKLYN, NEW YORK.

IMPROVEMENT IN CEMENT PIPES.

Specification forming part of Letters Patent No. 158,539, dated January 5, 1875; application filed November 3, 1874.

*To all whom it may concern:*

Be it known that I, MELVIN STEPHENS, of Brooklyn, in the county of Kings and State of New York, have invented an Improvement in Cement Pipes, of which the following is a specification:

Cement and other pipes have been made with a socket at one end of each length, into which the plain end of the next length of pipe is introduced, and cement and other materials have been introduced to make the socket tight, and a joint has been made with grooves within the socket and around the pipe, which grooves come opposite to each other when the parts are placed together; but this requires a large amount of lead or other filling material, and there is no contraction at the end of the socket.

My invention is made for uniting lengths of wrought-iron cement-lined pipes by locking the cement into the socket, so that it cannot become detached or the joint work loose by the setting of the earth or otherwise, and hence the joint cannot separate or become leaky, and at the same time there is not any increase in the quantity of cement or filling material required.

I make a recess near the end of the pipe of less diameter than the extreme end of the pipe, and I construct the socket with a contracted mouth, the end of which is opposite the recess of the next length, so that the cement or other packing material is of nearly uniform thickness, and within an annular space that has an outlet of less measurement than the space itself; hence, when the cement or other material hardens within that socket, it cannot be worked out of the socket, because it is confined behind the contracted mouth of the socket, and the pipe cannot be drawn out of such socket, because its end is larger than the cement or other packing, and the amount of cement required is not increased, but rather lessened.

Figure 1:
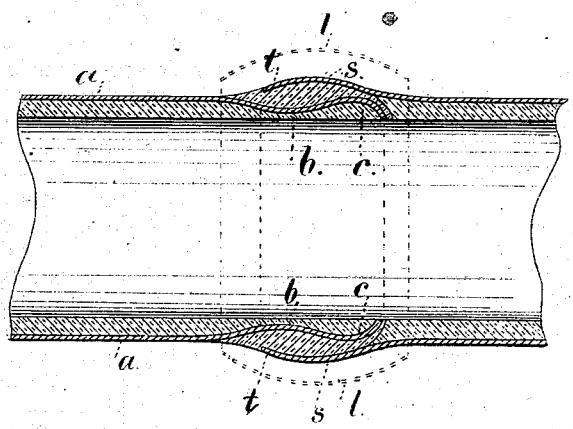
Figure 2:
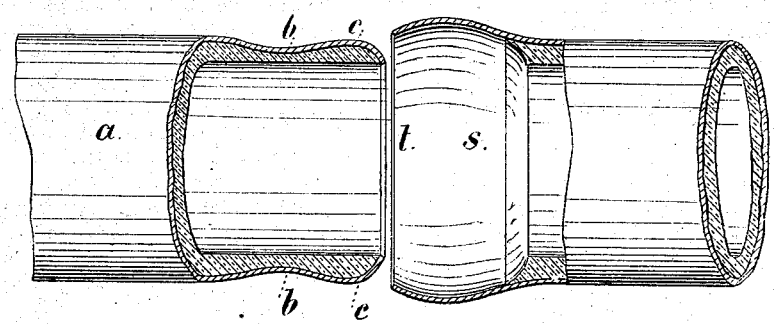

In the drawing, Figure 1 is a section of the joint uniting the two lengths of pipe, and Fig. 2 shows portions of those two lengths before they are united together.

The pipe $a$ is of any suitable size. $b$ is a depression near one end, which depression or recess runs around the pipe, and the portion $c$ near the end is of greater diameter than the pipe at the bottom of the depression, and it is preferable to have the portion $c$ about the same diameter as the pipe $a$ and similar to a segment of a globe, so that one length of the pipe may be laid at a slight angle to the next. The socket $s$ is large enough for receiving the end $c$ of the pipe, and the mouth of the socket is contracted at $t$, opposite the recess $b$, so that the filling of cement or other material introduced into the annular space between the socket and pipe end is locked into place and cannot escape, in consequence of the cement filling forming a ring that is larger than the mouth of the socket and of smaller interior diameter than the end $c$.

This improvement is of great importance with cement-lined water-pipes, because the cement passes between the parts of the wrought-metal tube, and these become so firmly united that nothing but violence can break the joint.

A sheet-metal ring, $l$, (shown by dotted lines in Fig. 1,) and a coating of cement may be employed around the joint as an additional precaution against leakage.

I claim as my invention—

1. The socket $s$, having a contracted mouth, in combination with the pipe $a$, made with a depression, $b$, adjacent to the end of the mouth, substantially as and for the purposes set forth.

2. The cement-lined pipe, made with the sheet-iron of the socket contracted at the mouth, for the purposes specified.

3. The cement-lined pipe, made with the sheet-iron at the smaller end contracted, or made with a groove at $b$, so as to leave the end of the pipe of larger diameter than the groove or recess around the pipe, for the purposes set forth.

Signed by me this 29th day of October, A. D. 1874.

MELVIN STEPHENS.

Witnesses:
GEO. T. PINCKNEY,
CHAS. H. SMITH.